(12) United States Patent
Gonthier et al.

(10) Patent No.: US 9,667,130 B2
(45) Date of Patent: May 30, 2017

(54) INRUSH CURRENT LIMITING CIRCUIT

(71) Applicants: STMicroelectronics (Tours) SAS, Tours (FR); STMicroelectronics, Inc., Coppell, TX (US)

(72) Inventors: Laurent Gonthier, Tours (FR); Muriel Nina, Vouvray (FR); Jurgis Astrauskas, St. Charles, IL (US)

(73) Assignees: STMicroelectronics (Tours) SAS, Tours (FR); STMicroelectronics, Inc., Coppell, TX (US)

(*) Notice: Subject to any disclaimer, the term of this patent is extended or adjusted under 35 U.S.C. 154(b) by 0 days.

(21) Appl. No.: 14/962,008

(22) Filed: Dec. 8, 2015

(65) Prior Publication Data
US 2016/0226370 A1    Aug. 4, 2016

(30) Foreign Application Priority Data
Feb. 2, 2015  (FR) .................................. 15 50789

(51) Int. Cl.
| | |
|---|---|
| *H02M 1/32* | (2007.01) |
| *H02M 1/10* | (2006.01) |
| *H02M 1/36* | (2007.01) |
| *H02H 9/00* | (2006.01) |
| *H02M 7/12* | (2006.01) |
| *H02M 7/515* | (2007.01) |

(52) U.S. Cl.
CPC .............. *H02M 1/32* (2013.01); *H02H 9/001* (2013.01); *H02M 1/10* (2013.01); *H02M 1/36* (2013.01); *H02M 7/125* (2013.01); *H02M 7/515* (2013.01); *H02M 2001/325* (2013.01)

(58) Field of Classification Search
CPC ............ H02M 1/32; H02M 1/36; H02M 1/10; H02M 7/125; H02M 7/515; H02M 2001/325; H02H 9/001
See application file for complete search history.

(56) References Cited

U.S. PATENT DOCUMENTS 5,032,968 A    7/1991  Mikami et al.
5,260,548 A *  11/1993 Todd .................. G05D 23/2401
                                                    219/483
(Continued)

FOREIGN PATENT DOCUMENTS

| DE | 3513365 A1 | 10/1986 |
|---|---|---|
| EP | 2871760 A1 | 5/2015 |
| WO | WO-2008131795 A1 | 11/2008 |

OTHER PUBLICATIONS

INPI Search Report and Written Opinion for FR 1550789 dated Sep. 18, 2015 (8 pages).

*Primary Examiner* — Jue Zhang
(74) *Attorney, Agent, or Firm* — Gardere Wynne Sewell LLP

(57) ABSTRACT

An AC/DC converter includes a first terminal and a second terminal for receiving an AC voltage and a third terminal and a fourth terminal for delivering a DC voltage. A capacitive circuit is connected between the third and fourth terminals. A rectifying bridge circuit has input terminals respectively coupled to the first and second terminals and has output terminal respectively connected to the third and fourth terminals. An inductive element is coupled in series with a first switch circuit between the first terminal and an input terminal of the rectifying bridge circuit.

30 Claims, 2 Drawing Sheets

(56) References Cited

U.S. PATENT DOCUMENTS

| | | | |
|---|---|---|---|
| 5,264,988 A | 11/1993 | Masaki | |
| 5,287,263 A * | 2/1994 | Shilo | H02H 9/001 323/908 |
| 5,994,848 A * | 11/1999 | Janczak | H05B 41/2856 315/224 |
| 2011/0043121 A1* | 2/2011 | Matsuda | H05B 33/0839 315/224 |
| 2012/0155138 A1* | 6/2012 | Gonthier | H02H 9/001 363/126 |
| 2012/0230075 A1 | 9/2012 | Lee | |

* cited by examiner

INRUSH CURRENT LIMITING CIRCUIT

PRIORITY CLAIM

This application claims the priority benefit of French Application for Patent No. 1550789, filed on Feb. 2, 2015, the contents of which is hereby incorporated by reference in its entirety to the maximum extent allowable by law.

TECHNICAL FIELD

The present disclosure generally relates to electronic devices and, more particularly, to AC/DC converters used upstream of a switched-mode power supply.

BACKGROUND

Many known AC/DC converter architectures are based on rectifying elements, which may be controllable (thyristors, for example) or not (diodes), powered with an AC voltage and supplying a DC voltage, this DC voltage being possibly itself converted back into an AC voltage.

The inrush current, that is, the current peaks which occur on each halfwave of the AC voltage as long as the voltage across a capacitor at the output of the rectifying bridge has not reached a sufficient level and, this, particularly, in starting phases, is generally desired to be limited.

The following documents describe examples of AC/DC converters: U.S. Pat. No. 5,032,968 and United States Patent Application Publication No. 2012/230075 (incorporated by reference).

SUMMARY

An embodiment overcomes all or part of the disadvantages of usual inrush current limiting circuits in a power converter.

An embodiment provides a solution compatible with the starting of a switched-mode power supply powered by the converted.

An embodiment provides a solution compatible with a voltage-doubling function at the level of a rectifying bridge powered with the AC voltage.

Thus, an embodiment provides an AC/DC converter comprising: a first terminal and a second terminal, intended to receive an AC voltage; a third terminal and a fourth terminal, intended to supply a first DC voltage; at least one first capacitive element connecting the third and fourth terminals; a rectifying bridge having input terminals respectively coupled to the first and second terminals and having output terminals respectively connected to the third and fourth terminals; and at least one first inductive element, in series with a first switch, between one of the first and second terminals and one of the input terminals of the bridge.

According to an embodiment, a rectifying element couples a node, between the first inductive element and the switch, to at least a fifth terminal, intended to supply at least a second voltage, referenced to the potential of the fourth terminal and having an amplitude smaller than that of the first voltage.

According to an embodiment, the switch controls the turn-on phase angle of the bridge.

According to an embodiment, the switch is a triac.

According to an embodiment, the control reference of the triac is connected to said node.

According to an embodiment, a transformer is interposed between the rectifying element and the fifth terminal.

According to an embodiment, a second inductive element connects the second terminal to the fourth terminal.

According to an embodiment, the inductive elements are coupled and form a common-mode filter.

According to an embodiment, the switch is formed of two common-cathode thyristors.

According to an embodiment, the converter comprises at least one configuration element between a follower mode and a voltage-doubling mode.

BRIEF DESCRIPTION OF THE DRAWINGS

The foregoing and other features and advantages will be discussed in detail in the following non-limiting description of specific embodiments in connection with the accompanying drawings, among which.

DETAILED DESCRIPTION

Figure 1:
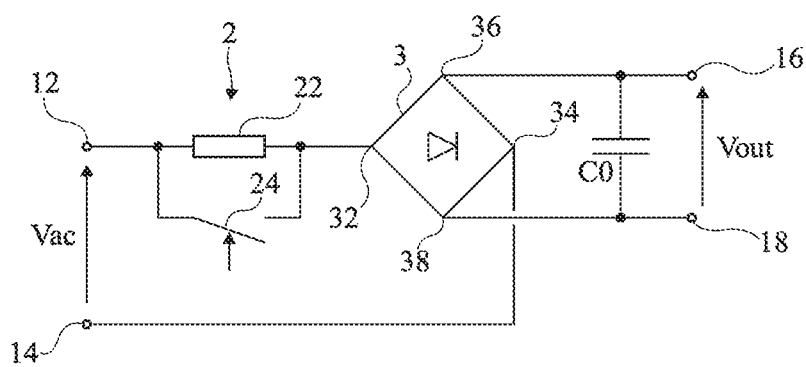
FIG. 1 schematically shows an example of usual architecture of an AC/DC converter equipped with an inrush current limiting circuit.

The same elements have been designated with the same reference numerals in the different drawings. In particular, the structural and/or functional elements common to the different embodiments may be designated with the same reference numerals and may have identical structural, dimensional, and material properties. For clarity, only those steps and elements which are useful to the understanding of the described embodiments have been shown and will be detailed. In particular, the circuits powered by the power converter have not been detailed, the described embodiments being compatible with usual applications. In the following description, when reference is made to terms "about", "approximately", or "in the order of", this means to within 10%, preferably to within 5%.

FIG. 1 schematically shows an example of usual architecture of an AC/DC converter equipped with an inrush current limiting circuit.

Two input terminals 12 and 14 are intended to receive an AC voltage, for example, the voltage of the electric distribution network (for example, 230 or 120 volts, 50 or 60 Hz). Terminal 12 is connected, via an inrush current limiting assembly 2, to a first rectifying input terminal 32 of a rectifying bridge 3 (for example, fullwave) having its second rectifying input terminal 34 connected to terminal 14. Rectified outputs 36 and 38 of the bridge are respectively connected to output terminals 16 and 18, supplying a DC voltage. A storage and smoothing capacitor C0 connects terminals 16 and 18. The inrush current limiting assembly 2 is a circuit formed of a resistor 22, connected between terminals 12 and 32, and a switch 24 which may be controlled to bypass resistor 22. At the starting (capacitor C0 discharged), switch 24 is turned off and resistor 22 limits the charge current of capacitor C0. In steady state, switch 24 is turned on to bypass the resistor 22 and limit losses.

More sophisticated solutions use, between an input terminal of application of the AC voltage and the rectifying bridge, a device for controlling the bridge turn-on phase angle, that is, for selecting the time, for each halfwave of the AC voltage, from which the rectifying bridge is powered. In such a case, a resistive element is generally present between the AC voltage application terminal and the switch. Further, the starting of the converter requires a voltage source to power a circuit for controlling the phase control switch. Current solutions often use complex assemblies. Further, the presence of the resistive element increases losses.

Figure 2:
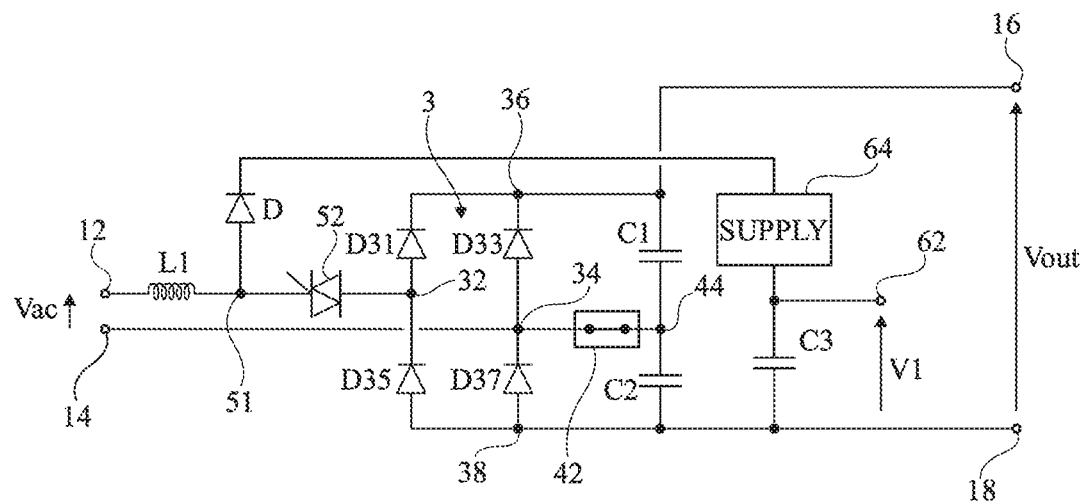
FIG. 2 very schematically shows an embodiment of an AC/DC converter having an inrush current limiting circuit.

FIG. 2 schematically shows an embodiment of an AC/DC converter having an inrush current limiting circuit.

It shows rectifying bridge 3 having input terminals coupled with first and second terminals 12 and 14 of application of an AC voltage Vac and having rectified output terminals connected (directly) to third and fourth terminals 16 and 18 for supplying a DC voltage Vout. At least one capacitive element interconnects terminals 16 and 18.

In the example of FIG. 2, a converter capable of operating in voltage-doubling mode or in follower mode is assumed. Accordingly, two capacitive elements C1 and C2 (of same value) in series between terminals 16 and 18 and an element 42 (for example, a jumper, a switch, a relay, etc.) connecting junction point 44 of capacitive elements C1 and C2 to terminal 14 are provided. When connection 42 is open (no connection between terminal 14 and node 44), the bridge operates in follower mode, that is, the maximum value of voltage Vout corresponds to the peak value of voltage Vac (to within losses). When connection 42 is active, the converter operates in voltage-doubling mode, that is, the maximum value of voltage Vout corresponds to twice the peak value of voltage Vac.

A phase-control element, for example formed of a triac 52, is series-connected with an inductive element L1 between one (32) of the AC input terminals of bridge 3 and terminal 12. Triac 52 is intended to control the bridge turn-on phase angle.

To enable the converter to start, and more particularly to control triac 52, a rectifying element D which couples junction point 51 of inductance L1 and of triac 52 to a fifth terminal 62 for supplying a low DC voltage V1 is provided. Low DC voltage means a voltage lower (by a ratio of at least 10) than the voltage provided between terminals 16 and 18. DC voltage V1 is intended to power the electronic control circuits of the converter and, in particular, a circuit (for example, a microcontroller, not shown in FIG. 2) for controlling triac 52 via a control device (not shown) which manages the voltage difference between reference nodes 18 and 51. In the example of FIG. 2, voltage V1 is provided between terminal 62 and terminal 18 which forms a common reference for the circuits referenced to the DC voltage bus. A capacitor C3 connects terminals 62 and 18. Still in the example of FIG. 2, the presence of a power supply circuit 64, for example, of voltage regulator type, is assumed between diode D and terminal 62.

Figure 3:
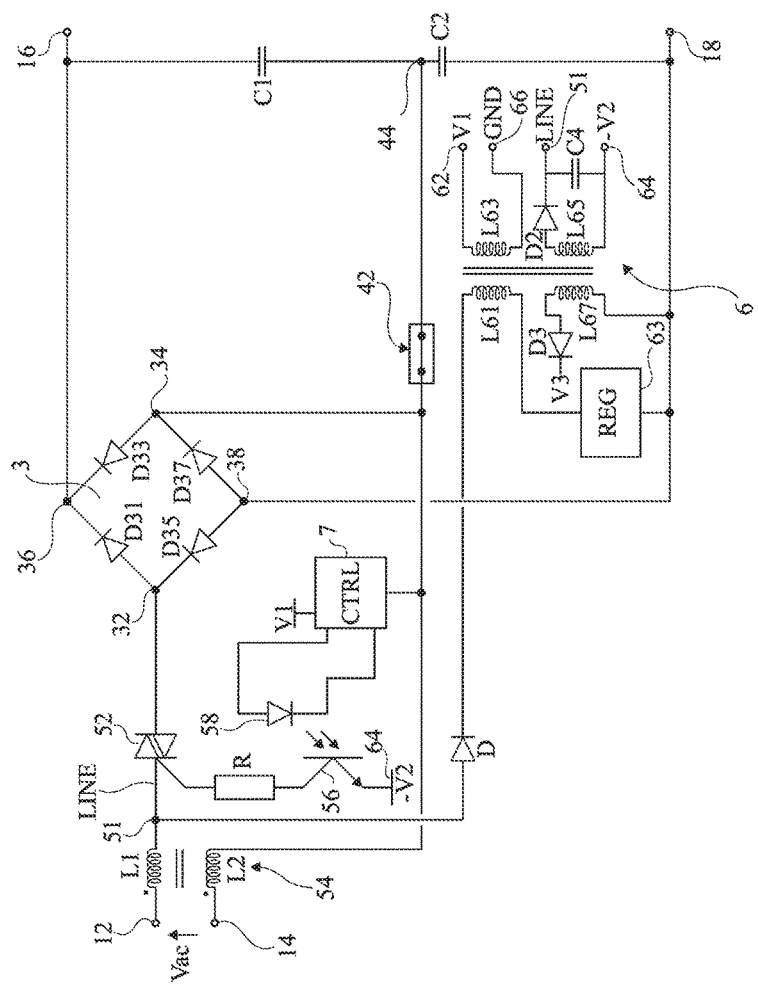
FIG. 3 is a more detailed representation of an embodiment of a power converter provided with an inrush current limiter.

FIG. 3 schematically shows a more detailed embodiment of an AC/DC converter having an inrush current limiting circuit. It shows a rectifying bridge 3 (diodes D31, D33, D35, D37) having input terminals 32 and 34 coupled with first and second terminals 12 and 14 of application of an AC voltage Vac and having rectified output terminals 36 and 38 connected (directly) to third and fourth terminals 16 and 18 for supplying a DC voltage Vout. The output capacitive element is, as in FIG. 2, formed of two capacitors C1 and C2 in series.

To provide the switching between the follower mode and the voltage-doubling mode, a connection element 42 (for example, a jumper, a switch, a relay, etc.) couples node 44 to terminal 14.

On the side of input terminals 12 and 14, inductive element L1 belongs to a common-mode filter 54, formed of a transformer having a first winding L1 connecting terminal 51 of diode D to terminal 12 and having a second winding L2, coupled to the first one, coupling terminal 14 to element 42.

In the example of FIG. 3, a portion of the control of triac 52 has been illustrated. The gate thereof is connected, by a resistor R in series with an opto-transistor 56 of an optocoupler, to a terminal 64 for supplying a voltage (−V2) which is negative with respect to the voltage of terminal 18. A photodiode 58 of the optocoupler is capable of being controlled by a control circuit 7 (CTRL), for example, of microcontroller type, to turn on the triac by applying a phase angle control. Circuit 7 is for example powered with a positive voltage V1.

An advantageous feature of the shown embodiment comprises placing the control reference of triac 52 at node 51. This enables to use a common power supply to power the gate circuit of triac 52 (that is, in particular, the transistor of its optocoupler 64) and the circuit of other triacs (not shown) which may have their references also connected to node 51 (or 12) in order to control alternating loads between nodes 12 and 14.

The generation of DC voltages V1 and −V2 is obtained from a rectification performed by diode D. For example, a transformer 6 comprises, on the primary side, a first winding L61 having a first end connected to the cathode of diode D1 and thus having a second end connected, via a regulator (REG) 63, to ground 18. At the secondary of transformer 6, a first winding L63 supplies at its terminals (62 and 66) voltage V1, terminal 66 being actually common to terminal 18. A second winding L65 supplies negative voltage −V2, a first end of winding L65 being coupled, by a diode D2, to terminal 51 (anode of diode D) and its other end being connected to terminal 64 supplying voltage −V2. A capacitive element C4 connects terminals 51 and 64. The function of diode D2 is to form, with diode D, a rectifying half-bridge.

The example of FIG. 3 assumes the presence of a fourth winding L67 capable of supplying a third DC voltage V3, in this example, positive, winding ends 67 being respectively connected by a diode D3 to the terminal supplying voltage V3 and directly to ground 18.

In operation, diode D37 of the bridge enables to close the current flow path, with the current flowing through diode D, first winding 61, regulator 63, diode D37 and back to terminal 14 of voltage Vac, and thus enables to generate low voltages V1, −V2, and V3. The presence of inductive element L1 limits current peaks and the di/dt at the closing of the triac.

Be it in follower mode or in doubling mode, the circuit thus provided enables to limit the inrush current while avoiding the presence of a resistive element. Further, advantage is taken of a common-mode filter generally present, having sufficient "stray" inductive values in differential mode to fulfill the required function.

Further, the need for a second switched-mode power supply to generate the low voltages is avoided.

According to a variation, not shown, the function performed by the triac is fulfilled by two common-cathode thyristors connected to terminal 36, which thus replace diodes D31 and D33. This embodiment does not enable to double the input voltage and only operates in follower mode.

Various embodiments have been described. Various alterations, modifications, and improvements will readily occur to those skilled in the art. In particular, the structure of the assembly for generating the low power supply voltages (with respect to the voltage provided by the AC/DC conversion performed by the main bridge) depends on the application and on the required voltages. Further, the practical implementation of the embodiments which have been described is within the abilities of those skilled in the art based on the functional indications given hereabove.

The invention claimed is:

1. An AC/DC converter, comprising:
a first terminal and a second terminal configured to receive an AC voltage;
a third terminal and a fourth terminal configured to supply a first DC voltage;
at least one first capacitive element connected between the third and fourth terminals;
a rectifying bridge having input terminals respectively coupled to the first and second terminals and having output terminals respectively connected to the third and fourth terminals; and
a first inductive element coupled in series with a first switch between one of the first and second terminals and one of the input terminals of the rectifying bridge; and
a rectifying element coupling an intermediate node between the first inductive element and the first switch to at least a fifth terminal that is configured to supply at least a second voltage referenced to the potential of the fourth terminal and having an amplitude smaller than an amplitude of the first voltage.

2. The converter of claim 1, wherein the first switch is configured to control the turn-on phase angle of the bridge.

3. The converter of claim 1, wherein the first switch is a triac.

4. The converter of claim 3, wherein a control reference of the triac is connected to said intermediate node.

5. The converter of claim 1, wherein a transformer is interposed between the rectifying element and the fifth terminal.

6. The converter of claim 1, wherein a second inductive element connects the second terminal to the fourth terminal.

7. The converter of claim 6, wherein the first and second inductive elements are coupled and function as a common-mode filter.

8. The converter of claim 1, wherein the first switch is formed of two thyristors having a common cathode.

9. The converter of claim 1, further comprising at least one selectable connection element coupled between the second terminal and the first capacitive element to configure the converter in one of a follower mode and a voltage-doubling mode.

10. A converter, comprising:
a first input terminal configured to receive an AC voltage;
a first inductor coupled between the first input terminal and a first intermediate node;
a rectifier circuit having a first input and a first output;
a first output terminal configured to output a DC voltage, said first output terminal coupled to the first output of the rectifier circuit;
a triac having a first terminal coupled to the first intermediate node and a second terminal coupled to the first input of the rectifier circuit;
a rectifying device having an anode terminal coupled to the first intermediate node; and
a voltage generator circuit having an input coupled to a cathode terminal of the rectifying device and further having a first voltage output, said voltage generator circuit configured to generate a negative DC voltage at said first voltage output.

11. The converter of claim 10, further comprising an output capacitor coupled to the first output terminal.

12. The converter of claim 10, further comprising:
a second output terminal to output the DC voltage;
a first capacitor coupled between the first output terminal and a second intermediate node; and
a second capacitor coupled between the second intermediate node and the second output terminal.

13. The converter of claim 12, wherein the rectifier circuit has a second input and a second output; wherein the second output is coupled to the second output terminal; and wherein the second input is selectively coupled to the second intermediate node by a selection circuit.

14. The converter of claim 13, further comprising a second input to receive the AC voltage, wherein the second input of the rectified circuit is coupled to the second input terminal.

15. The converter of claim 14, further comprising a second inductor coupled between the second input terminal and the second input of the rectifier circuit.

16. The converter of claim 15, wherein the first and second inductors form a common mode filter circuit.

17. The converter of claim 10, wherein said voltage generator further has a second voltage output, said voltage generator circuit configured to generate a positive DC voltage at said second voltage output.

18. The converter of claim 10, wherein said triac further comprises a control terminal, further comprising a control circuit connected between the control terminal and the first voltage output at the negative DC voltage.

19. The converter of claim 18, wherein said control circuit comprises an optical actuation circuit.

20. An AC/DC converter, comprising:
a first terminal and a second terminal configured to receive an AC voltage;
a third terminal and a fourth terminal configured to supply a first DC voltage;
at least one first capacitive element connected between the third and fourth terminals;
a rectifying bridge having input terminals respectively coupled to the first and second terminals and having output terminals respectively connected to the third and fourth terminals; and
a first inductive element coupled in series with a first switch between one of the first and second terminals and one of the input terminals of the rectifying bridge;
a rectifying element having a first terminal coupled to an intermediate node between the first inductive element and the first switch; and
a transformer having an input coupled to a second terminal of the rectifying element and an output at a fifth terminal that is configured to supply a second voltage.

21. The converter of claim 20, wherein the second voltage is referenced to the potential of the fourth terminal and has an amplitude smaller than an amplitude of the first voltage.

22. The converter of claim 20, wherein the first switch is configured to control the turn-on phase angle of the bridge.

23. The converter of claim 20, wherein the first switch is a triac.

24. The converter of claim 20, wherein the transformer further has a further output at a sixth terminal that is configured to supply a negative voltage, and wherein a control terminal of the first switch is coupled through a control circuit to said sixth terminal.

25. The converter of claim 24, wherein the control circuit is a transistor device having a conduction path coupled between the control terminal and the sixth terminal.

26. The converted of claim 25, wherein the transistor device is a phototransistor.

27. The converter of claim 20, wherein a second inductive element connects the second terminal to the fourth terminal.

28. The converter of claim 27, wherein the first and second inductive elements are coupled and function as a common-mode filter.

29. The converter of claim 20, wherein the first switch is formed of two thyristors having a common cathode.

30. The converter of claim 20, further comprising at least one selectable connection element coupled between the second terminal and the first capacitive element to configure the converter in one of a follower mode and a voltage-doubling mode.

* * * * *